(12) United States Patent
Hsieh

(10) Patent No.: US 7,712,920 B1
(45) Date of Patent: May 11, 2010

(54) LIGHT COLOR ADJUSTMENT STRUCTURE FOR ILLUMINATED KEYBOARDS

(75) Inventor: Yu-Chun Hsieh, Taipei Hsien (TW)

(73) Assignee: Zippy Technology Corp., Hsien-Tien, Taipei Hsien (TW)

(*) Notice: Subject to any disclaimer, the term of this patent is extended or adjusted under 35 U.S.C. 154(b) by 0 days.

(21) Appl. No.: 12/437,980

(22) Filed: May 8, 2009

(51) Int. Cl.
*F21V 33/00* (2006.01)

(52) U.S. Cl. .................. 362/249.02; 362/253; 362/324; 362/29; 200/310; 200/314

(58) Field of Classification Search .................. 362/26, 362/27, 29, 30, 324, 253, 555, 249.02, 612; 200/310, 314
See application file for complete search history.

(56) References Cited

U.S. PATENT DOCUMENTS

| 6,179,432 | B1 | 1/2001 | Zhang et al. | |
| 6,199,996 | B1 | 3/2001 | Katrinecz, Jr. et al. | |
| 6,284,988 | B1 | 9/2001 | Wantanabe et al. | |
| 6,322,229 | B1 | 11/2001 | Chan et al. | |
| 6,554,442 | B2 | 4/2003 | Chou | |
| 6,797,902 | B2 * | 9/2004 | Farage et al. | 200/314 |
| 2002/0181192 | A1 * | 12/2002 | Huang et al. | 361/683 |
| 2003/0000817 | A1 * | 1/2003 | Farage et al. | 200/314 |
| 2007/0025097 | A1 * | 2/2007 | Cheng | 362/85 |

FOREIGN PATENT DOCUMENTS

| CN | 1763879 A | 4/2006 |
| TW | 438035 | 5/2001 |
| TW | 465777 | 11/2001 |
| TW | 468833 | 12/2001 |
| TW | 509955 | 11/2002 |
| TW | 516671 | 1/2003 |
| TW | 535385 | 6/2003 |
| TW | 570235 | 1/2004 |
| TW | 200636672 | 10/2006 |
| TW | M310388 | 4/2007 |

* cited by examiner

*Primary Examiner*—Laura Tso
(74) *Attorney, Agent, or Firm*—Muncy, Geissler, Olds, Lowe, PLLC (57) ABSTRACT

A light color adjustment structure for illuminated keyboards to resolve the shortcomings of conventional illuminated keyboards that generate mono light and unalterable includes a light source module located in an illuminated keyboard and a brightness control module located in the illuminated keyboard and electrically connected to the light source module. The light source module has at least a first light source and a second light source of different light colors that are mixed to generate a light color for the illuminated keyboard. The brightness control module generates a brightness control signal sent to the light source module to control the brightness of the light source module. Thus through brightness alterations and mixing of the first and second light sources varying light colors can be generated.

20 Claims, 8 Drawing Sheets

LIGHT COLOR ADJUSTMENT STRUCTURE FOR ILLUMINATED KEYBOARDS

FIELD OF THE INVENTION

The present invention relates to a light color adjustment structure for illuminated keyboards and particularly to a light color adjustment structure to generate a light color for an illuminated keyboard by mixing at least two light sources of different colors.

BACKGROUND OF THE INVENTION

A prolific of illuminated keyboards have been developed and disclosed in prior art for desktop and notebook computers to facilitate keyboard operation in a low brightness or dark environment. References can be found in U.S. Pat. Nos. 6,284,988, 6,322,229, 6,199,996, 6,554,442 and 6,179,432, and R.O.C. patent Nos. 509955, 465777, 535385, 438035, 570235, 468833 and 516671. They all have a build-in lighting sheet to emit light to enable users to clearly judge striking positions of a keyboard. They also have a common feature, namely the light color of the illuminated keyboard is fixed and unalterable. As a result, the light color and brightness of the illuminated keyboard cannot be adjusted as desired. The light color or brightness could be too strong and irritate users' eyes, or too dark or weak and cause input errors.

To remedy the aforesaid problem, techniques to adjust light color of illuminated keyboards have been developed. There are mainly two methods to adjust the light color. One is adjusting the light color through computer software, such as R.O.C. patent publication No. 200636672. It discloses a keyboard and a method to select the color of keys on the keyboard. The keyboard has a backlight module including LEDs of red, green and blue colors. Through a color tuning software, various colors can be displayed on a computer screen to allow users to select required colors. By selecting the color emitted by the LEDs, color adjustment can be accomplished. China patent publication No. CN1763879 discloses a keyboard backlight module and method thereof. It also has a keyboard backlight module consisting of LEDs in red, green and blue colors. Through a color tuning software, the ratio of various colors can be displayed on a computer screen, then users can adjust the color ratio to mix and generate a desired color. The adjustment methods mentioned above have to rely on the color tuning software.

There is another method which adjusts the light color of an illuminated keyboard through keys on the keyboard, such as R.O.C. patent No. M310388. It discloses a keyboard with adjustable lighting brightness. The keyboard has a plurality of light color switches each corresponding to a different light color. By depressing the light color switches, the light color of the illuminated keyboard can be changed. But its light color switches are set to corresponding fixed light colors. Selection is confined to the fixed light colors, and users cannot adjust light color and brightness according to their requirements.

SUMMARY OF THE INVENTION

Therefore, the primary object of the present invention is to solve the aforesaid disadvantages and allow users to directly operate on the keyboard to adjust brightness as desired and also mix and generate required light colors.

To achieve the foregoing object, the present invention provides a light color adjustment structure for illuminated keyboards. It includes a light source module located in an illuminated keyboard and a brightness control module located in the illuminated keyboard and electrically connected to the light source module. The light source module has at least a first light source and a second light source of different light colors. The first light source and the second light source are mixed to generate the light color for the illuminated keyboard. The brightness control module has a brightness control member located in the illuminated keyboard and a control unit triggered by the brightness control member to output a brightness control signal. The brightness control signal is sent to the light source module to control the brightness thereof. Thus through brightness alterations of the first light source and the second light source varying light colors can be mixed and generated. As a result, the present invention can produce required light colors easier than the conventional techniques.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
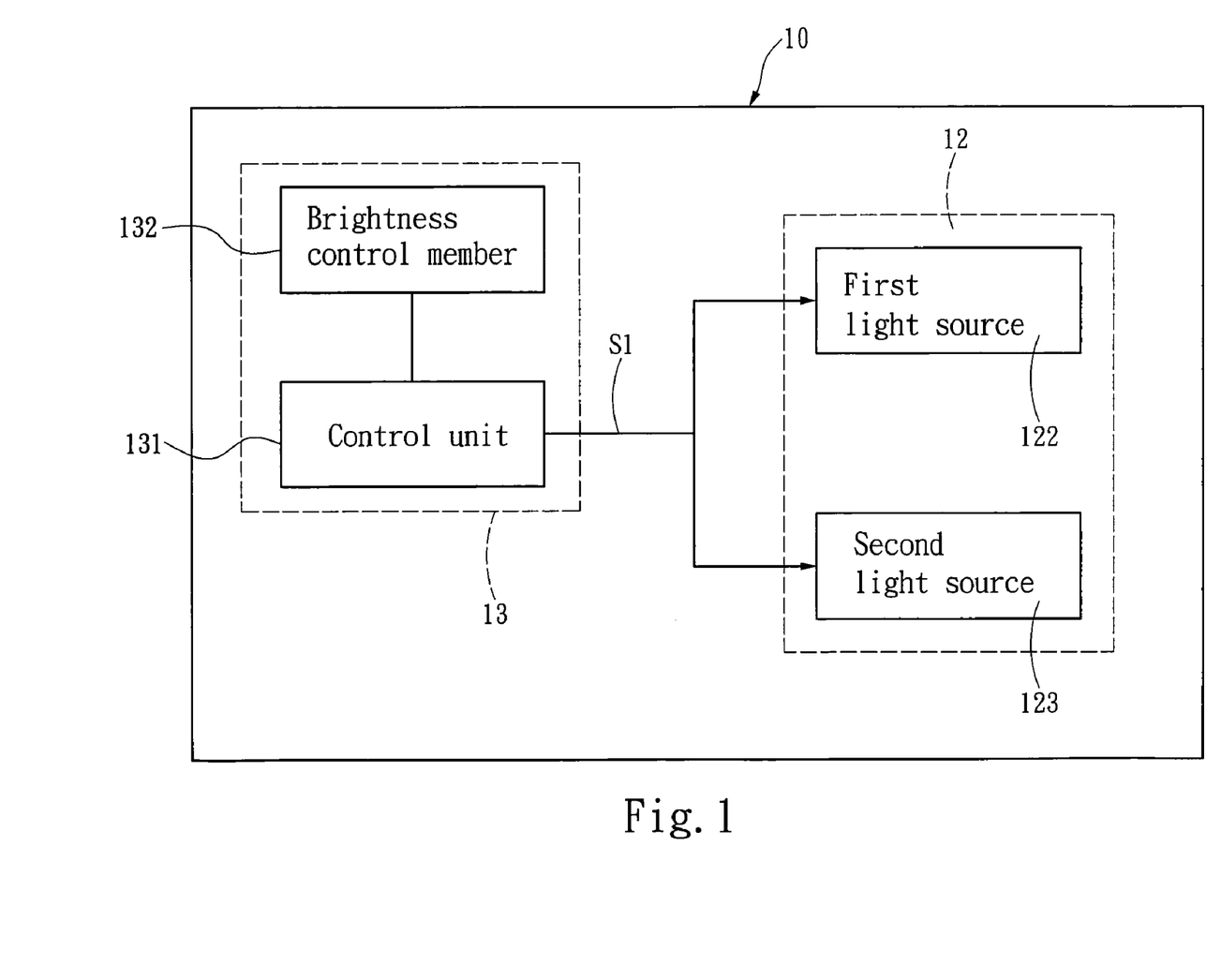
FIG. 1 is a block diagram of the invention.

Please refer to FIG. 1, the light color adjustment structure for illuminated keyboards according to the invention includes a light source module 12 located in an illuminated keyboard 10 and a brightness control module 13 located in the illuminated keyboard 10 and electrically connected to the light source module 12. The light source module 12 has at least a first light source 122 and a second light source 123 of different light colors to be mixed to generate light colors for the illuminated keyboard 10. The brightness control module 13 has a brightness control member 132 and a control unit 131 located in the illuminated keyboard 10. The control unit 131 is triggered by the brightness control member 132 to generate a brightness control signal S1 sent to the light source module 12 to control the brightness of the first light source 122 or the second light source 123. Through brightness alterations of the first light source 122 and the second light source 123, the light color of the illuminated keyboard 10 can be adjusted. Thus forms the main structure of the invention.

Figure 2:
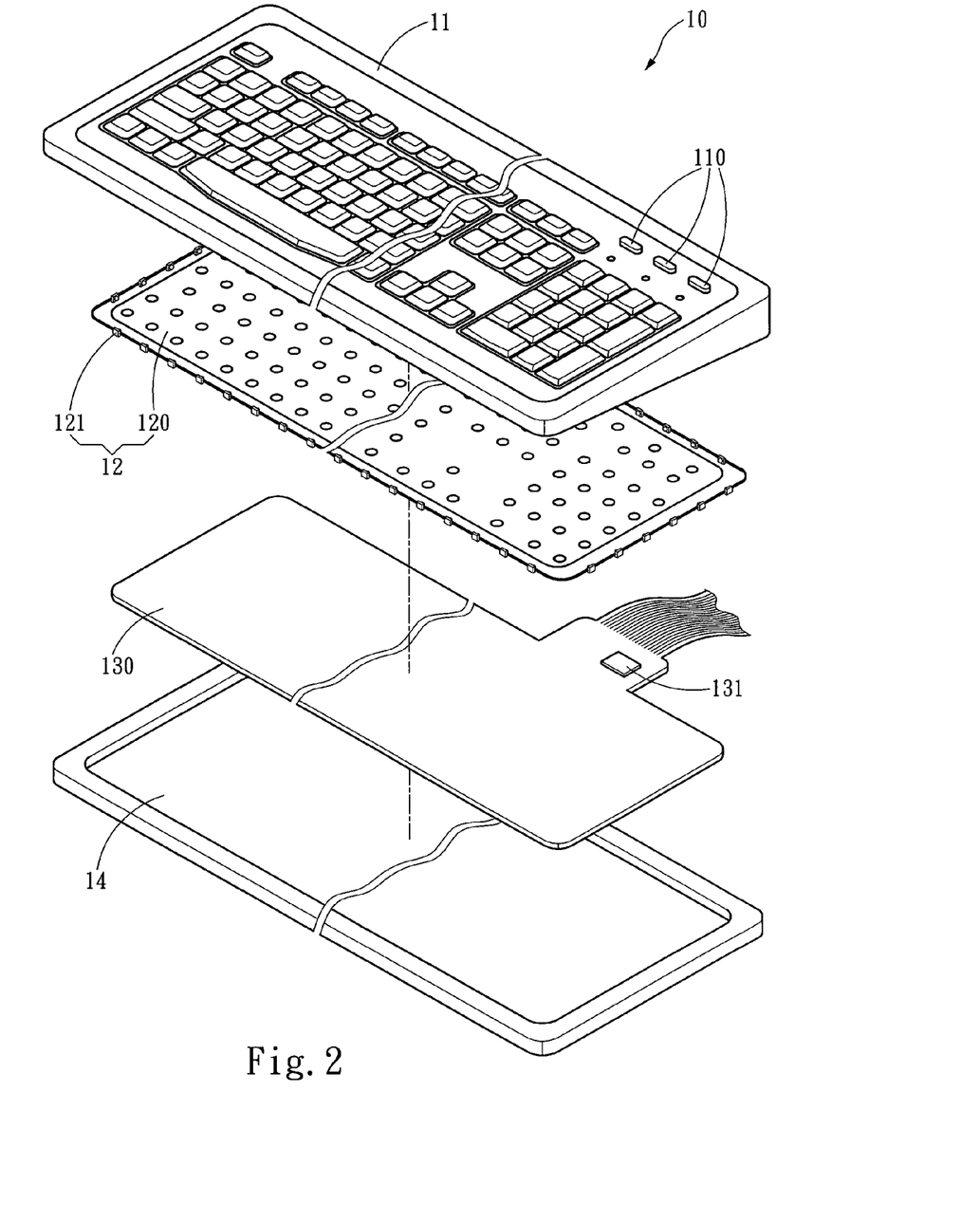
FIG. 2 is an exploded view of the invention.
Figure 3:
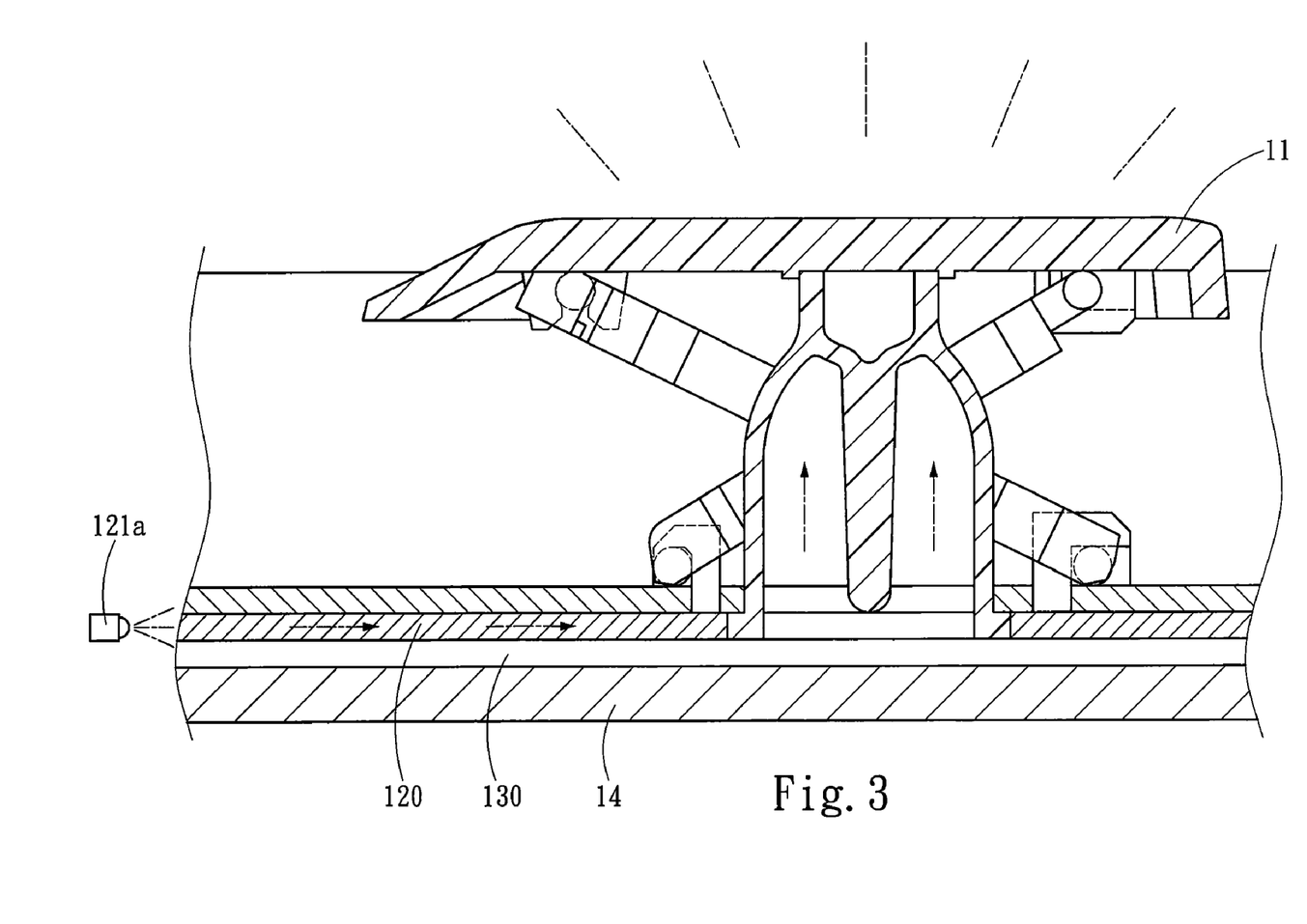
FIG. 3 is a cross section of a first embodiment of the invention.
Figure 4:
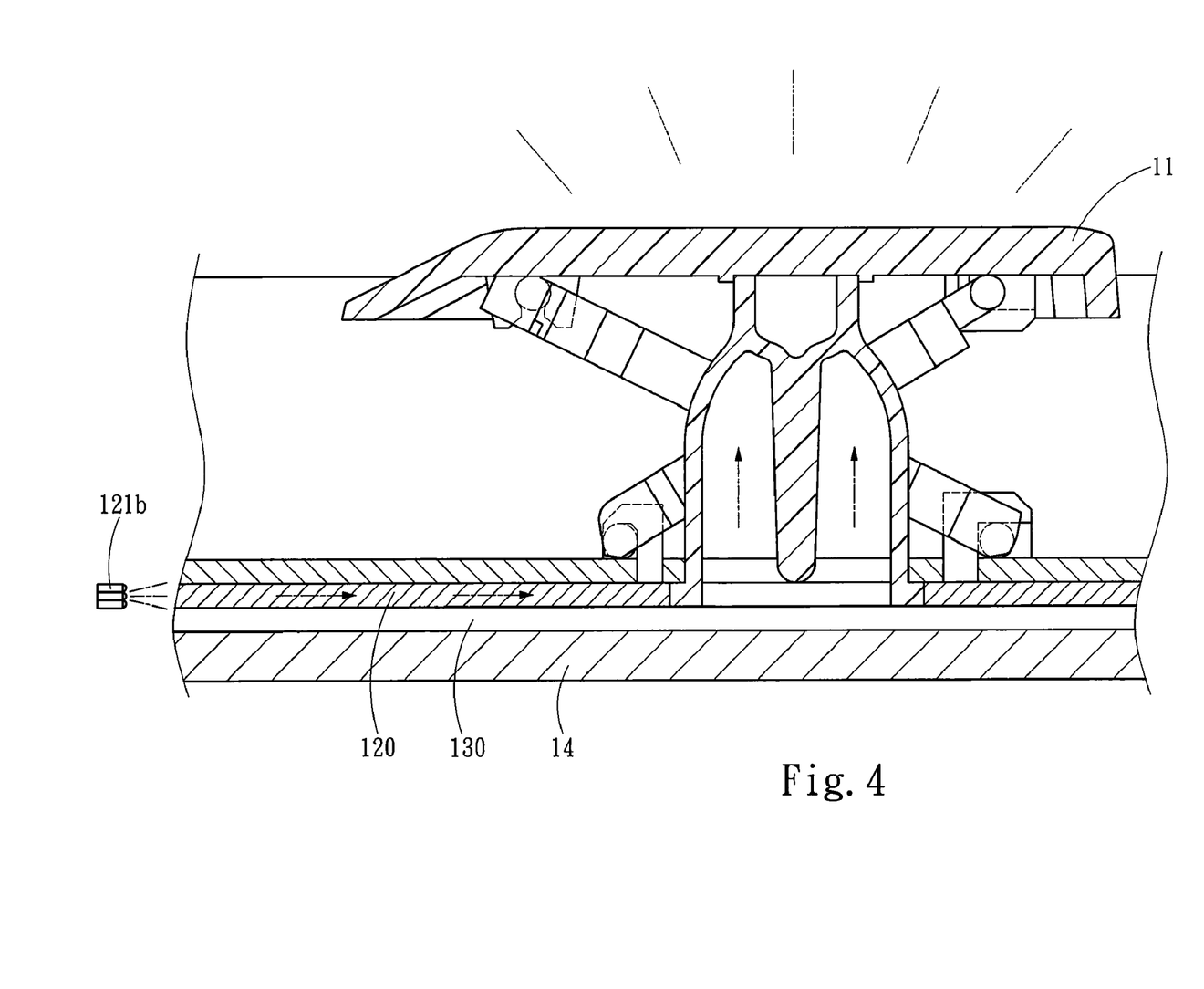
FIG. 4 is a cross section of a second embodiment of the invention.
Figure 5:
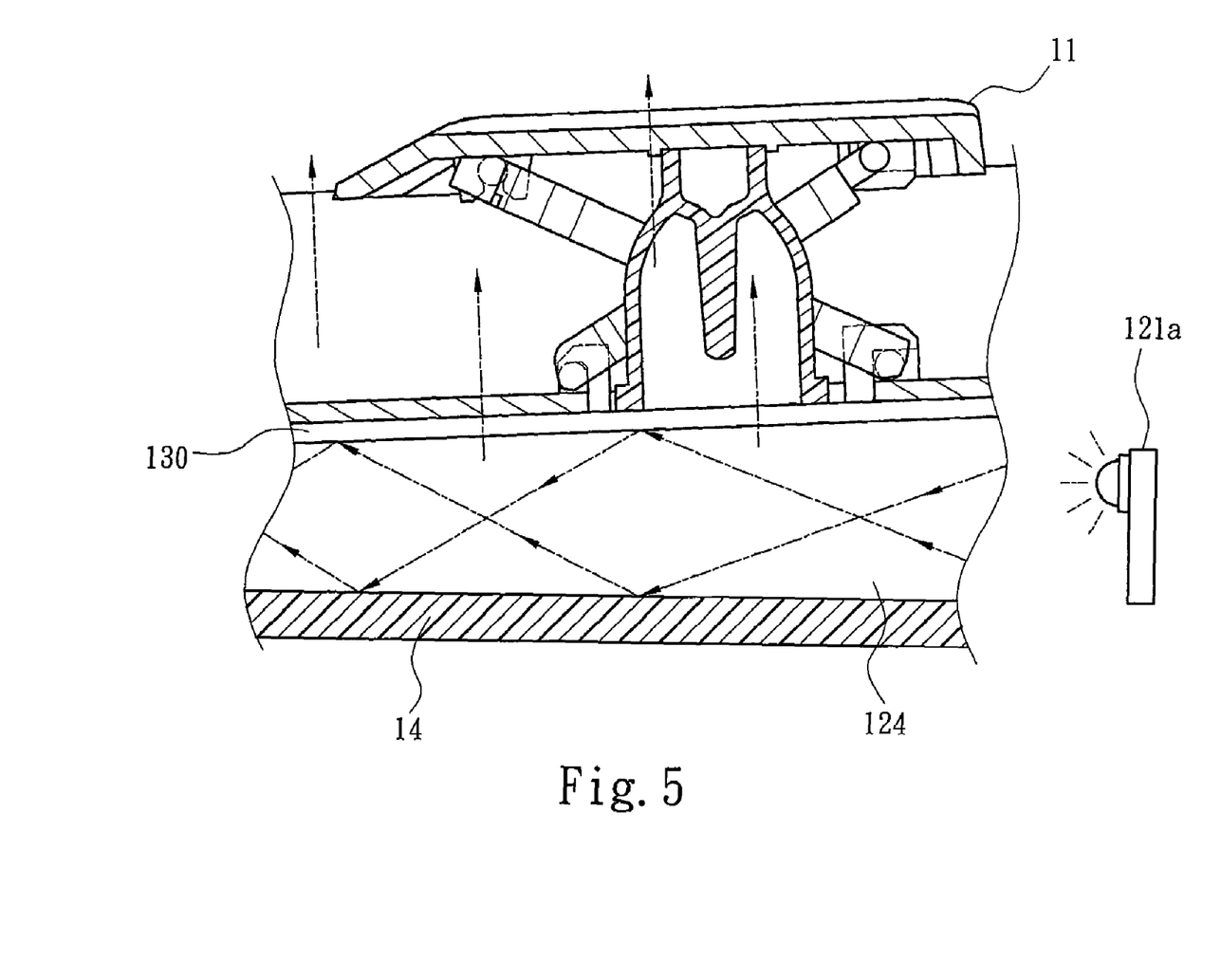
FIG. 5 is a schematic view of a third embodiment of the invention.

Also referring to FIG. 2, in an embodiment of the invention, the illuminated keyboard 10 further has a key section 11 and a base board 14 beneath the key section 11. The brightness control module 13 further has a circuit board 130 located between the key section 11 and base board 14 with the control unit 131 located thereon. The control unit 131 is a microprocessor on the circuit board 130. The light source module 12 is located between the key section 11 and the base board 14. The light source module 12 may include a light directing board 120 and a lamp set located on the periphery of the light directing board 120, but this is not the limitation. The lamp set 121 includes at least the first light source 122 and the second light source 123 of different light colors. Referring to FIG. 3, the first light source 122 and second light source 123 may be generated at the same time from a single light emitting diode (LED) 121a; or as shown in FIG. 4, a plurality of LEDs 121b are provided to generate individually the first light source 122 or the second light source 123. The light source module 12 of the invention may be implemented by incorporating the lamp set 121 with other means not limited by the light directing board 120 as previously discussed. FIG. 5 illustrates another embodiment in which the light source module 12 has a light directing space 124 located between the circuit board 130 and the base board 14 in the illuminated keyboard 10, and a lamp set 121 located in the light directing space 124. The light directing space 124 is formed at a height shrinking with the increasing distance of the lamp set 121. The lamp set 121 may be a single LED 121a to simultaneously generate the first light source 122 and the second light source 123, or a plurality of LEDs 121b to individually generate the first light source 122 or the second light source 123. The light passes through the light directing space 124 and the circuit board 123 and projects the key section 11.

Figure 6:
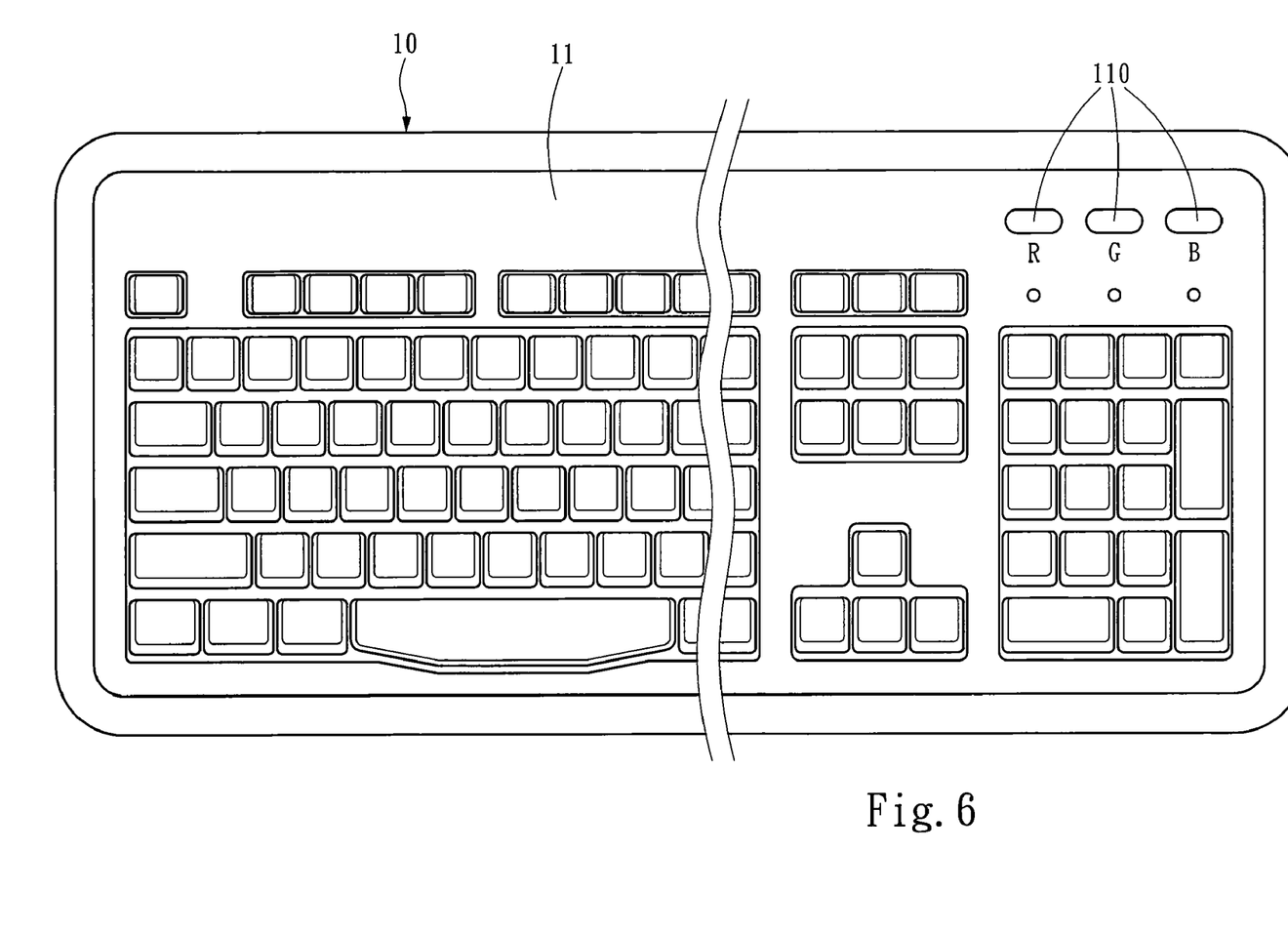
FIG. 6 is a schematic view of a fourth embodiment of the invention.

The invention, through the brightness control member 132 to trigger the control unit 131 to generate the brightness control signal S1 to adjust the light color of the illuminated keyboard 10. In practice, the brightness control member 132 may be a hot key 110 located in the key section 11 as shown in FIG. 6. By depressing the hot key 110, the brightness control signal S1 is output to control respectively the brightness of the first light source 122 and the second light source 123. For instance, the first light source 122 may represent a red light source (R), the second light source 123 may represent a green light source (G), and a third light source (B) may also be added to represent a blue color. The light sources 122 and 123 have different degrees of brightness intensity. The hot key 110 can be depressed to respectively adjust the brightness of the light sources 122 and 123. Brightness alteration of the light sources 122 and 123 may be set in a gradual enhancing mode so that when the light sources 122 and 123 have the greatest brightness, the brightness control signal S1 changes to the weakest brightness. On the other hand, the brightness alteration of the light source 122 and 123 may also be set in a gradual reducing mode so that when the light sources 122 and 123 have the weakest brightness, the brightness control signal S1 changes to the strongest brightness. Thus the brightness of the light sources 122 and 123 can be controlled by the brightness control signal S1 and changes from weaker to stronger, or from stronger to weaker in a cyclic fashion. Through the approach previously discussed, the ratio of the red, green and blue (RGB) light sources 122 and 123 can be controlled and mixed to generate a required light color.

Figure 7:
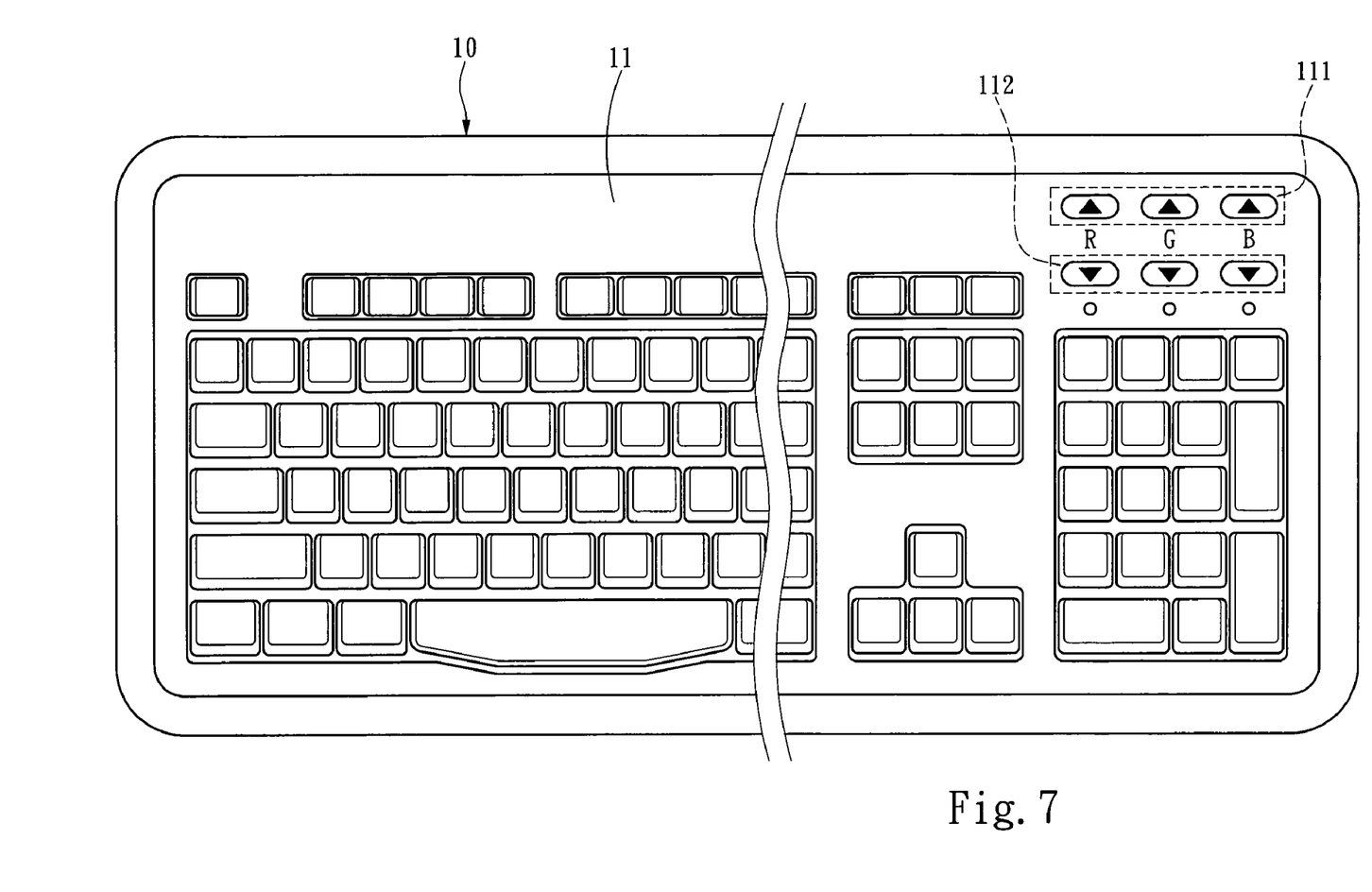
FIG. 7 is a schematic view of a fifth embodiment of the invention.
Figure 8:
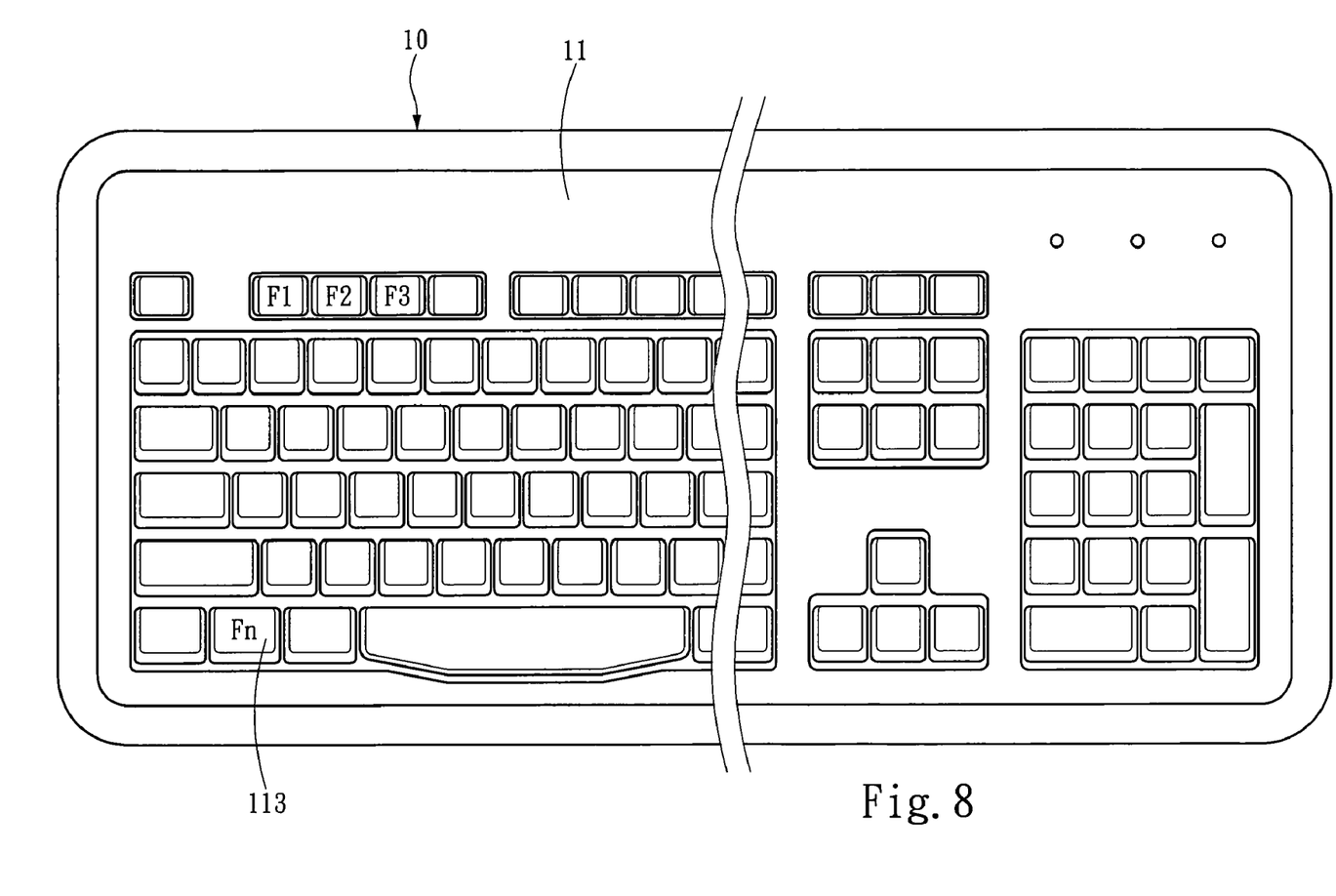
FIG. 8 is a schematic view of a sixth embodiment of the invention.

Aside from providing the single hot key 110 to function as the brightness control member 132 to control the brightness in a cyclic fashion, FIG. 7 shows yet another embodiment in which the brightness control member 132 includes a brightness enhancing key 111 and a brightness reducing key 112 corresponding to individual light sources 122 and 123. Through the brightness enhancing key 111 and the brightness reducing key 112, increasing or decreasing of the brightness of the light sources 122 and 123 can be directly controlled. FIG. 8 shows still another embodiment in which a function key 113 is provided to incorporate with F1 key to control the brightness of the first light source 122, and incorporate with F2 key to control the brightness of the second light source 123.

As a conclusion, the invention has the light source module 12 in the illuminated keyboard 10 that includes at least the first light source 122 and the second light source 123 of different light colors to be mixed to generate the light color for the illuminated keyboard 10. Through the brightness control module 13 on the illuminated keyboard 10, the brightness control signal S1 is sent to the light sources 122 and 123 to control their brightness so that users can directly perform adjustment on the illuminated keyboard 10 to mix and generate a desired light color for the illuminated keyboard 10. It is much simpler than the conventional techniques and provides a significant improvement.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A light color adjustment structure for illuminated keyboards, comprising:
    a light source module which is located in an illuminated keyboard and has at least a first light source and a second light source of different light colors that are mixed to generate a light color for the illuminated keyboard; and
    a brightness control module which has a brightness control member located in the illuminated keyboard and a control unit triggered by the brightness control member to output a brightness control signal to the light source module to control brightness alteration of the light source module to adjust the light color of the illuminated keyboard.

2. The light color adjustment structure of claim 1, wherein the brightness alteration of the light source is increasing gradually.

3. The light color adjustment structure of claim 2, wherein the brightness control signal received by each light source at the strongest brightness thereof turns to the weakest brightness.

4. The light color adjustment structure of claim 1, wherein the brightness alteration of the light source is decreasing gradually.

5. The light color adjustment structure of claim 4, wherein the brightness control signal received by each light source at the weakest brightness thereof turns to the strongest brightness.

6. The light color adjustment structure of claim 1, wherein each light source of the light source module has varying degrees of brightness.

7. The light color adjustment structure of claim 6, wherein the brightness alteration of the light source is increasing gradually.

8. The light color adjustment structure of claim 7, wherein the brightness control signal received by each light source at the strongest brightness thereof turns to the weakest brightness.

9. The light color adjustment structure of claim 6, wherein the brightness alteration of the light source is decreasing gradually.

10. The light color adjustment structure of claim 9, wherein the brightness control signal received by each light source at the weakest brightness thereof turns to the strongest brightness.

11. The light color adjustment structure of claim 1, wherein the light source module includes a light directing board located in the illuminated keyboard and a lamp set located on the periphery of the light directing board.

12. The light color adjustment structure of claim 11, wherein the lamp set is a light emitting diode to simultaneously generate the first light source and the second light source.

13. The light color adjustment structure of claim 11, wherein the lamp set is a plurality of light emitting diodes to generate individually the first light source or the second light source.

14. The light color adjustment structure of claim 1, wherein the light source module includes a light directing space located in the illuminated keyboard and a lamp set located in the light directing space, the light directing space being formed at a height decreasing gradually with an increasing distance of the lamp set.

15. The light color adjustment structure of claim 14, wherein the lamp set is a light emitting diode to simultaneously generate the first light source and the second light source.

16. The light color adjustment structure of claim 14, wherein the lamp set is a plurality of light emitting diodes to generate individually the first light source or the second light source.

17. The light color adjustment structure of claim 1, wherein the control unit is a microprocessor.

18. The light color adjustment structure of claim 1, wherein the brightness control member is a hot key to trigger the control unit to control the light source to increase or decrease brightness.

19. The light color adjustment structure of claim 1, wherein the brightness control member includes a brightness enhancing key to trigger the control unit to increase the brightness of the light source and a brightness reducing key to decrease the brightness of the light source.

20. The light color adjustment structure of claim 1, wherein the brightness control member includes composite keys which have a function key incorporating with at least one key.

\* \* \* \* \*